(12) United States Patent
Jang et al.

(10) Patent No.: US 12,365,997 B2
(45) Date of Patent: Jul. 22, 2025

(54) BISMUTH VANADATE ELECTRODE COMPRISING VANADIUM-FUNCTIONALIZED GRAPHENE QUANTUM DOTS AND A PREPARATION METHOD THEREOF

(71) Applicants: S-Oil Corporation, Seoul (KR); UNIST (ULSAN NATIONAL INSTITUTE OF SCIENCE AND TECHNOLOGY), Ulsan (KR)

(72) Inventors: Ji-Hyun Jang, Ulsan (KR); Ki-Yong Yoon, Ulsan (KR); Sungwoo Kwon, Ulsan (KR); Nam Hyun Hur, Ulsan (KR); Sang Cheol Paik, Ulsan (KR)

(73) Assignees: S-OIL CORPORATION, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/331,769

(22) Filed: Jun. 8, 2023

(65) Prior Publication Data
US 2024/0352600 A1   Oct. 24, 2024

Related U.S. Application Data

(62) Division of application No. 16/932,277, filed on Jul. 17, 2020, now Pat. No. 11,713,512.

(30) Foreign Application Priority Data

Oct. 11, 2019   (KR) .......................... 10-2019-0126058

(51) Int. Cl.
C25B 11/051   (2021.01)
C25B 1/04   (2021.01)
(Continued)

(52) U.S. Cl.
CPC .............. *C25B 11/051* (2021.01); *C25B 1/04* (2013.01); *C25B 11/057* (2021.01); *C25B 11/075* (2021.01)

(58) Field of Classification Search
CPC   C25B 1/04; C25B 1/55; C25B 11/051; C25B 11/057; C25B 11/075
See application file for complete search history.

(56) References Cited

PUBLICATIONS

Liu Guo, Junqi Li, Nan Lei, Qianqian Song, Zheng Liang, Morphological evolution and enhanced photoelectrochemical performance of V4+ self-doped, [010] oriented BiVO4 for water splitting, Journal of Alloys and Compounds, Sep. 2018, vol. 771, 2019, pp. 914-923 (Year: 2018).*

(Continued)

*Primary Examiner* — Luan V Van
*Assistant Examiner* — Mofoluwaso S Jebutu
(74) *Attorney, Agent, or Firm* — DUANE MORRIS LLP; Gregory M. Lefkowitz; Brandon A. Chan

(57) ABSTRACT

A bismuth vanadate electrode including vanadium-functionalized graphene quantum dots and a method for preparing the same is disclosed. More particularly, the addition of graphene quantum dots (GQDs) in the process of immersing a bismuth vanadate ($BiVO_4$) electrode in an alkaline solution to remove vanadium oxide ($V_2O_5$) excessively formed on the surface of the electrode during its preparation, protects the electrode from the alkaline solution as the graphene quantum dots are adsorbed onto the surface of $BiVO_4$ while $V_2O_5$ is removed. This improves the efficiency of oxygen evolution reaction (OER) when applied to a photoanode due to vanadium (V)-functionalized graphene quantum dots formed as the etched vanadium ions (($VO)_4^{3-}$) are adsorbed onto the graphene quantum dots.

4 Claims, 10 Drawing Sheets

(51) Int. Cl.
  *C25B 11/057* (2021.01)
  *C25B 11/075* (2021.01)

(56) References Cited

PUBLICATIONS

Di Tang, Hengchao Zhang, Hui Huang, Ruihua Liu, Yuzhi Han, Yang Liu, Cuiyan Tong and Zhenhui Kang, Carbon quantum dots enhance the photocatalytic performance of BiVO4 with different exposed facets, Dalton Trans., 2013,42, 6285-6289 (Year: 2013).*

Di Tang, Hengchao Zhang, Hui Huang, Ruihua Liu, Yuzhi Han, Yang Liu, Cuiyan Tong and Zhenhui Kang, Supplementary Information: Carbon quantum dots enhance the photocatalytic performance of BiVO4 with different exposed facets, Dalton Trans., 2013,42, 6285-6289 (Year: 2013).*

Hai Ming, Zheng Ma, Yang Liu, Keming Pan, Hang Yu, Fang Wang and Zhenhui Kang, Large scale electrochemical synthesis of high quality carbon nanodots and their photocatalytic property, Dalton Trans., 2012,41, 9526-9531 (Year: 2012).*

Jason K. Cooper, Soren B. Scott, Yichuan Ling, Jinhui Yang, Sijie Hao, Yat Li, Francesca M. Toma, Martin Stutzmann, K. V. Lakshmi, and Ian D. Sharp, Role of Hydrogen in Defining the n-Type Character of BiVO4 Photoanodes, Chemistry of Materials 2016 28 (16), 5761-5771 (Year: 2016).*

Jason K. Cooper, Soren B. Scott, Yichuan Ling, Jinhui Yang, Sijie Hao, Yat Li, Francesca M. Toma, Martin Stutzmann, K. V. Lakshmi, and Ian D. Sharp, Supporting Information: Role of Hydrogen in Defining the n-Type Character of BiVO4 Photoanodes, Chemistry of Materials 2016 28 (16), 5761-5771 (Year: 2016).*

Thiago M. Prado, Amanda Carrico, Fernando H. Cincotto, Orlando Fatibello-Filho, Fernando C. Moraes, Bismuth vanadate/graphene quantum dot: A new nanocomposite for photoelectrochemical determination of dopamine, Sensors and Actuators B: Chemical, vol. 285, Jan. 2019, pp. 248-253. (Year: 2019).*

Tong, Y., Lai, S., Wu, F. et al. ZnO Porous Nanosheets with Partial Surface Modification for Enhanced Charges Separation and High Photocatalytic Activity Under Solar Irradiation. Nanoscale Res Lett 14, 151 ( May 2019). (Year: 2019)*

Qingguang Pan et al., "BiVO4 nanocrystals with controllable oxygen vacancies induced by Zn-doping coupled with graphene quantum dots for enhanced photoelectrochemical water splitting," Chemical Engineering Journal, vol. 372, Sep. 15, 2019, pp. 399-407 (Year: 2019).

Qingguang Pan et al., "Supporting information for BiVO4 nanocrystals with controllable oxygen vacancies induced by Zn-doping coupled with graphene quantum dots for enhanced photoelectrochemical water splitting," Chemical Engineering Journal, vol. 372, Sep. 15, 2019, pp. 399-407 (Year: 2019).

Juan Peng et al., Graphene Quantum Dots Derived from Carbon Fibers, Nano Letters Dec. 2012 (2), 844-849 (Year: 2012).

Juan Peng et al., Supplementary Information for Graphene Quantum Dots Derived from Carbon Fibers, Nano Letters Dec. 2012 (2), 844-849 (Year: 2012).

Yongcheng Wang, Yue-Yu Zhang, Jing Tang, Haoyu Wu, Ming Xu, Zheng Peng, Xin-Gao Gong, and Gengfeng Zheng, Simultaneous Etching and Doping of TiO2 Nanowire Arrays for Enhanced Photoelectrochemical Performance, ACS Nano Jul. 2013 (10), 9375-9383 (Year: 2013).

* cited by examiner

BISMUTH VANADATE ELECTRODE COMPRISING VANADIUM-FUNCTIONALIZED GRAPHENE QUANTUM DOTS AND A PREPARATION METHOD THEREOF

CROSS-REFERENCE TO RELATED APPLICATIONS

This application is a divisional application of U.S. application Ser. No. 16/932,277, filed Jul. 17, 2020, which claims priority under 35 U.S.C. § 119 to Korean Patent Application No. 10-2019-0126058 filed on Oct. 11, 2019 in the Korean Intellectual Property Office, the entireties of which are incorporated herein by reference.

TECHNICAL FIELD

The present disclosure relates to a bismuth vanadate electrode including vanadium-functionalized graphene quantum dots and a method for preparing the same. More particularly, it relates to a technology which is capable of, by adding graphene quantum dots (GQDs) in the process of immersing a bismuth vanadate ($BiVO_4$) electrode in an alkaline solution to remove vanadium oxide ($V_2O_5$) excessively formed on the surface of the electrode during its preparation, protecting the electrode from the alkaline solution as the graphene quantum dots are adsorbed onto the surface of $BiVO_4$ while $V_2O_5$ is removed, and improving the efficiency of oxygen evolution reaction (OER) when applied to a photoanode due to vanadium (V)-functionalized graphene quantum dots formed as the etched vanadium ions $((VO)_4^{3-})$ are adsorbed onto the graphene quantum dots.

BACKGROUND

With increasing energy consumption, environmental problems are increasing significantly. Development of clean, inexpensive and renewable energy sources is one of important tasks for satisfying both energy and environment problems.

Solar light, biomass and geothermal energy are presented as clean and renewable energy sources that can be satisfactory in the aspects of both energy and environment. Water splitting is a reaction mechanism whereby hydrogen gas is produced using solar energy in a photoelectrochemical (hereinafter, 'PEC') cell.

A PEC cell consists of two parts: a photoanode and a counter electrode. Oxygen evolution reaction (hereinafter, 'OER'; $2H_2O \rightarrow O_2 + 4H^+ + 4e^-$) occurs at the photoanode, and hydrogen evolution reaction (hereinafter 'HER'; $4H^+ + 4e^- \rightarrow 2H_2$) occurs at the counter electrode.

The improvement of the performance of the PEC cell for water splitting whereby hydrogen and oxygen gases are produced by solar light is emerging as an important issue in the field of energy and environment as an inexpensive and clean energy source. Metal oxide semiconductors such as $TiO_2$, ZnO, $Fe_2O_3$ and $BiVO_4$ have been studied widely as photoanodes suitable for PEC water splitting systems. Bismuth vanadate ($BiVO_4$) is an ideal metal oxide photoanode for a PEC system due to a theoretical solar-to-hydrogen (STH) efficiency of 9.2% under air mass (AM) 1.5 G illumination, low cost, an adequate band gap (2.4 eV) for visible light absorption, and superior chemical stability in neutral electrolytes. However, because bismuth vanadate has poor charge transport and short hole-diffusion length, the PEC performance is decreased due to electron-hole recombination occurring on the surface. In addition, since bismuth vanadate is unstable in NaOH, which is an alkaline substance for removing excessively added vanadium oxide, there is also a disadvantage that high-efficiency bismuth vanadate electrodes cannot be obtained with high yield. In order to overcome these disadvantages, various strategies of using OER catalysts and using neutral or weakly basic electrolytes have been introduced. However, for preparation of high-efficiency bismuth vanadate electrodes, use of the NaOH solution which is an alkaline material for removing excess vanadium oxide is still necessary.

In order to solve this problem, research and development are keenly required on the method for effectively preparing a bismuth vanadate electrode.

The inventors of the present disclosure have identified that, by adding graphene quantum dots in the process of immersing a bismuth vanadate ($BiVO_4$) electrode in an alkaline solution to remove vanadium oxide ($V_2O_5$) excessively formed on the surface of the electrode during its preparation, the electrode can be protected from the alkaline solution as the graphene quantum dots are adsorbed onto the surface of $BiVO_4$ while $V_2O_5$ is removed, and the efficiency of oxygen evolution reaction (OER) can be improved when applied to a photoanode due to vanadium (V)-functionalized graphene quantum dots formed as the etched vanadium ions $((VO)_4^{3-})$ are adsorbed onto the graphene quantum dots, and have completed the present disclosure.

SUMMARY

The present disclosure is directed to, by adding graphene quantum dots (GQDs) in the process of immersing a bismuth vanadate ($BiVO_4$) electrode in an alkaline solution to remove vanadium oxide ($V_2O_5$) excessively formed on the surface of the electrode during its preparation, protecting the electrode from the alkaline solution as the graphene quantum dots are adsorbed onto the surface of $BiVO_4$ while $V_2O_5$ is removed, and improving the efficiency of oxygen evolution reaction (OER) when applied to a photoanode due to vanadium (V)-functionalized graphene quantum dots formed as the etched vanadium ions $((VO)_4^{3-})$ are adsorbed onto the graphene quantum dots.

An aspect of the present disclosure relates to a bismuth vanadate electrode comprising vanadium-functionalized graphene quantum dots, which includes: (i) a bismuth vanadate ($BiVO_4$) electrode; and (ii) graphene quantum dots adsorbed on the surface of the bismuth vanadate electrode, wherein the graphene quantum dots are vanadium-functionalized by adsorption of vanadium ions.

Another aspect of the present disclosure relates to a photoanode including the bismuth vanadate electrode including vanadium-functionalized graphene quantum dots according to the present disclosure.

Another aspect of the present disclosure relates to a photoelectrochemical cell for water splitting, which includes the photoanode according to the present disclosure.

Another aspect of the present disclosure relates to a method for preparing a bismuth vanadate electrode including vanadium-functionalized graphene quantum dots, which includes: (a) a step of preparing a mixture solution of a NaOH solution and graphene quantum dots (GQDs); and (b) a step of immersing a $BiVO_4$ electrode including vanadium oxide ($V_2O_5$) in the mixture solution.

According to the present disclosure, by adding graphene quantum dots in the process of immersing a bismuth vanadate ($BiVO_4$) electrode in an alkaline solution to remove vanadium oxide ($V_2O_5$) excessively formed on the surface of the electrode during its preparation, the electrode can be protected from the alkaline solution as the graphene quantum dots are adsorbed onto the surface of $BiVO_4$ while $V_2O_5$ is removed, and the efficiency of oxygen evolution reaction (OER) can be improved when applied to a photoanode due to vanadium (V)-functionalized graphene quantum dots formed as the etched vanadium ions (($VO)_4^{3-}$) are adsorbed onto the graphene quantum dots.

DETAILED DESCRIPTION OF EMBODIMENTS

Figure 1A:
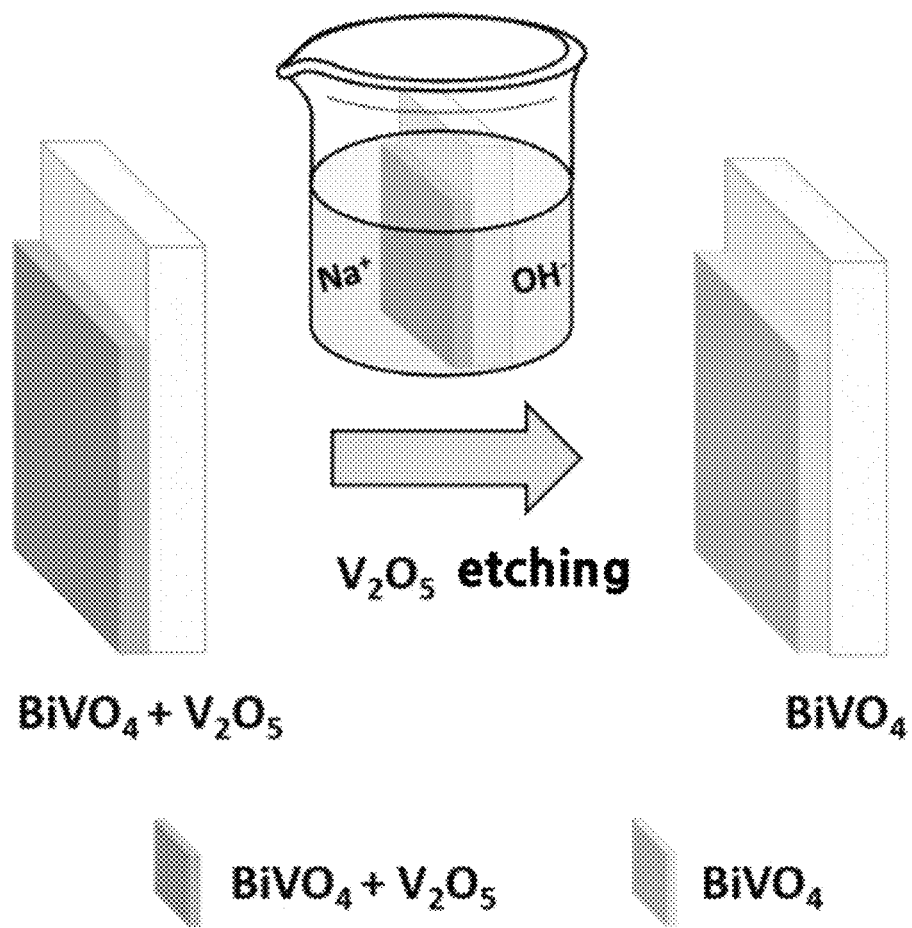
FIGS. 1A to 1E show schematics of a process of preparing an existing $BiVO_4$ electrode in Comparative Example 1 (FIG. 1A) and a process of preparing a $BiVO_4$ electrode including vanadium-functionalized GQDs in Example 1 (FIG. 1B), and scanning electron microscopy (SEM) images of fluorine-doped tin oxide (FTO) with a bismuth oxyiodide (BiOI) nanosheet formed (FIG. 1C), an existing $BiVO_4$ electrode prepared in Comparative Example 1 (FIG. 1D) and a $BiVO_4$ electrode including vanadium-functionalized GQDs prepared in Example 1-2 (FIG. 1E).

Hereinafter, various aspects and exemplary embodiments of the present disclosure are described in more detail.

In the preparation process of an existing bismuth vanadate electrode, vanadium oxide ($V_2O_5$) formed excessively during the process is removed by immersing in NaOH, which is an alkaline solution. In this case, the production yield of the electrode is decreased due to the damage of the electrode in the alkaline solution and the efficiency of oxygen evolution reaction (OER) is also decreased. As a result, when the electrode is applied to a photoelectrochemical (PEC) cell for water splitting, the performance of the cell is decreased.

The inventors of the present disclosure have identified that, by adding graphene quantum dots in the process of immersing a bismuth vanadate ($BiVO_4$) electrode in an alkaline solution to remove vanadium oxide ($V_2O_5$) excessively formed on the surface of the electrode during its preparation, the electrode can be protected from the alkaline solution as the graphene quantum dots are adsorbed onto the surface of $BiVO_4$ while $V_2O_5$ is removed, and the efficiency of oxygen evolution reaction (OER) can be improved when applied to a photoanode due to vanadium (V)-functionalized graphene quantum dots formed as the etched vanadium ions (($VO)_4^{3-}$) are adsorbed onto the graphene quantum dots, and have completed the present disclosure.

An aspect of the present disclosure relates to a bismuth vanadate electrode including vanadium-functionalized graphene quantum dots, which includes: (i) a bismuth vanadate ($BiVO_4$) electrode; and (ii) graphene quantum dots adsorbed on the surface of the bismuth vanadate electrode, wherein the graphene quantum dots are vanadium-functionalized by adsorption of vanadium ions.

In an exemplary embodiment, in an effective peak formed in a range of 350-400 $cm^{-1}$ as a result of Raman spectroscopy for the bismuth vanadate including vanadium-functionalized graphene quantum dots, an intensity ratio ($I_B/I_A$) of the peak intensity ($I_A$) of bismuth vanadate and the peak intensity ($I_B$) of the bismuth vanadate including vanadium-functionalized graphene quantum dot may be 1.1-3. This means that the graphene quantum dots are vanadium (V)-functionalized by vanadium ions. Through this, a superior oxygen evolution reaction efficiency is achieved as compared to the existing electrode onto which graphene quantum dots are simply adsorbed.

Another aspect of the present disclosure relates to a photoanode including the bismuth vanadate electrode including vanadium-functionalized graphene quantum dots according to the present disclosure.

Another aspect of the present disclosure relates to a photoelectrochemical cell for water splitting, which includes the photoanode according to the present disclosure.

Another aspect of the present disclosure relates to a method for preparing a bismuth vanadate electrode including vanadium-functionalized graphene quantum dots, which includes: (a) a step of preparing a mixture solution of a NaOH solution and graphene quantum dots (GQDs); and (b) a step of immersing a $BiVO_4$ electrode including vanadium oxide in the mixture solution.

The method may further include, after the step (b), a step of washing the electrode with water and drying the same at room temperature.

The concentration of the NaOH solution may be 0.1-3 M, specifically 0.3-2 M, more specifically 0.5-1.5 M.

In another exemplary embodiment, the graphene quantum dots may be obtained through: (a-1) a step of sonicating a mixture of a carbon material and an acid; (a-2) a step of heat-treating the sonicated mixture at 80-200° C.; and (a-3) a step of cooling the heat-treated mixture and then adjusting pH to 6-9.

The carbon material may be one or more selected from a carbon fiber, a carbon nanotube, graphene, graphite, amorphous carbon, charcoal and a carbon-based material, although not being limited thereto. Specifically, a carbon fiber may be used. More specifically, a pitch-based carbon fiber may be used.

The acid may be one or more selected from sulfuric acid, nitric acid, acetic acid, hydrochloric acid, formic acid, carbonic acid and iodic acid, although not being limited thereto. Specifically, a mixture solution of sulfuric acid and nitric acid may be used.

The sonication may be performed for 30 minutes to 10 hours, specifically for 40 minutes to 5 hours, more specifically for 1-3 hours. A sonication time shorter than 30 minutes may be insufficient for making the carbon material into a nanopowder. And, a sonication time exceeding 10 hours may be economically unfavorable.

The heat treatment may be performed specifically at 90-180° C., more specifically at 100-140° C. If the heat treatment temperature is below 90° C. or above 180° C., graphene quantum dots with nonuniform particle size may be generated.

The pH may be specifically 7-8 for making the acidified graphene quantum dots basic After the step (a-3), a step of removing ions released from the acid by conducting dialysis using a dialysis bag may be included additionally in order to prevent side reactions by the unwanted ions released from the acid.

In another exemplary embodiment, the $BiVO_4$ electrode including vanadium oxide may be obtained by immersing a transparent substrate with a bismuth oxyiodide (BiOI) nanosheet formed in a vanadium precursor solution and then conducting heat treatment.

The transparent substrate may be one or more selected from FTO, ZnO, ITO, AZO, GZO, IZO and IGZO, although not being limited thereto. Specifically, an FTO substrate may be used.

The vanadium precursor may be one or more selected from vanadyl acetylacetonate, ammonium metavanadate, vanadium pentoxide and vanadium trioxide, although not being limited thereto. Specifically, vanadyl acetylacetonate may be used.

The heat treatment may be performed at 300-600° C., specifically at 350-550° C., more specifically at 400-500° C., for 30 minutes to 10 hours, specifically for 40 minutes to 5 hours, more specifically for 50 minutes to 2 hours. If the heat treatment temperature is below 300° C. or if the heat temperature time is shorter than 30 minutes, BiOI may remain without being changed to $BiVO_4$. And, if the heat treatment temperature is above 600° C. or if the heat temperature time is longer than 2 hours, it may economically unfavorable.

In another exemplary embodiment, in the step (b), the immersion may be performed for 10-200 minutes, specifically for 15-100 minutes, more specifically for 20-40 minutes. In particular, a remarkably superior photocurrent density is achieved when the immersion is performed for 20-40 minutes as compared to when the time falls outside the range.

Although not clearly specified in the following examples or comparative examples, the inventors have investigated the loss of vanadium-functionalized graphene quantum dots for the bismuth vanadate electrodes including vanadium-functionalized graphene quantum dots according to the present disclosure prepared by varying the preparation condition of graphene quantum dots, the concentration of NaOH, the carbon material and the acid used, the preparation condition of the vanadium oxide-including $BiVO_4$ electrode and the immersion time in the step (b) by Raman spectroscopic analysis after measuring oxygen evolution reaction (OER) activity for 500 cycles.

As a result, it was confirmed that no loss of vanadium-functionalized graphene quantum dots adsorbed onto the photoanode was observed and no loss of vanadium adsorbed onto the graphene quantum dot was observed even after 500 cycles of OER measurement when all of the following conditions were satisfied: (i) the graphene quantum dots are obtained through (a-1) a step of sonicating a mixture of a carbon material and an acid, (a-2) a step of heat-treating the sonicated mixture at 80-200° C., and (a-3) a step of cooling the heat-treated mixture and then adjusting pH to 6-9, (ii) the concentration of the NaOH solution is 0.5-1.5 M, (iii) the carbon material is a pitch-based carbon fiber, (iv) the acid is a mixture solution of sulfuric acid and nitric acid, (v) the $BiVO_4$ electrode including vanadium oxide is obtained by immersing a transparent substrate with a bismuth oxyiodide (BiOI) nanosheet formed in a vanadium precursor solution and then conducting heat treatment, (vi) the transparent substrate is FTO, (vii) the vanadium precursor is vanadyl acetylacetonate, (viii) the heat treatment for preparing the $BiVO_4$ electrode including vanadium oxide is performed at 400-500° C. for (ix) 50 minutes to 2 hours, and (x), in the step (b), the immersion is performed for 20-40 minutes. However, when any one of the above conditions was not satisfied, the loss of vanadium-functionalized graphene quantum dots adsorbed onto the photoanode and the loss of vanadium adsorbed onto the graphene quantum dots occurred significantly after the 500 cycles of OER measurement.

Hereinafter, the present disclosure will be described in more detail through preparation examples and examples referring to the attached drawings.

Preparation Examples 1-1 to 1-3: Preparation of Graphene Quantum Dots (GQDs)

A pitch-based carbon fiber (0.3 g) was added to a mixture solution of $H_2SO_4$ (60 mL) and $HNO_3$ (20 mL). The pitch-based carbon fiber solution was sonicated for about 2 hours and then heated at 100-140° C. (the size of graphene quantum dots is controlled depending on temperature) for 24 hours with stirring. Upon completion of reaction, the mixture was cooled to room temperature and, after adding distilled water (deionized water, 800 mL), pH was adjusted to 8 with $Na_2CO_3$. Graphene quantum dots dispersed in water were prepared after removing sulfate ions and nitrate ions from the acids by conducting dialysis for 3 days using a dialysis bag (retained molecular weight: 2000 Da). The heating temperature was 100° C., 120° C. and 140° C. for Preparation Examples 1-1, 1-2 and 1-3, respectively.

Comparative Example 1: Preparation of Existing Bismuth Vanadate ($BiVO_4$) Electrode A $BiVO_4$ electrode was prepared by a commonly known electrode preparation method. An FTO (fluorine (F)-doped tin oxide ($SnO_2$)) glass was washed sequentially with acetone, IPA and ethanol and then dried with nitrogen gas. Next, after mixing a 0.04 M $Bi(NO_3)_3$ solution with 50 mL of a 0.4 M potassium iodide (KI) solution, the solution pH was adjusted to 1.7 with $HNO_3$. Then, 20 mL of an anhydrous ethanol solution containing 0.23 M p-benzoquinone was mixed with the prepared solution. A bismuth oxyiodide (BiOI) nanosheet was formed on the FTO glass by conducting cathodic deposition at room temperature for 250 seconds by using FTO as a working electrode, a Pt mesh as a counter electrode and an Ag/AgCl electrode as a reference electrode, at −0.1 V vs Ag/AgCl.

Subsequently, BiOI was converted to $BiVO_4$ through impregnation. After immersing the FTO glass with the BiOI formed in 0.2 mL of a dimethyl sulfoxide (DMSO) solution containing 0.2 M vanadyl acetylacetonate, a $BiVO_4$ electrode with BiVO$_4$ formed and with excess V$_2$O$_5$ added on the surface was obtained by heat-treating at 450° C. (ramping rate=2° C./min) for 2 hours.

Finally, in order to remove vanadium oxide (V$_2$O$_5$) formed on the surface of BiVO$_4$, the BiVO$_4$ electrode was immersed for about 30 minutes in 100 ml of a 1 M NaOH solution, washed with water and dried at room temperature. Through this, a bismuth vanadate (BiVO$_4$) electrode with vanadium oxide removed was prepared.

Comparative Example 2: Preparation of Graphene Quantum Dot-Including BiVO$_4$ (GQDs/BiVO$_4$) Electrode After immersing the vanadium oxide (V$_2$O$_5$)-removed BiVO$_4$ electrode obtained in Comparative Example 1 in 100 ml of the graphene quantum dot solution prepared in Preparation Example 1-2 for about 30 minutes, followed by washing with water and drying at room temperature, a bismuth vanadate (BiVO$_4$) electrode with the graphene quantum dots (GQDs) adsorbed on the surface was prepared.

Examples 1-1 to 1-3: Preparation of Vanadium-Functionalized Graphene Quantum Dot-Including BiVO$_4$ (V-GQDs/BiVO$_4$) Electrode A bismuth vanadate (BiVO$_4$) electrode with vanadium-functionalized graphene quantum dots (V-functionalized GQDs) adsorbed on the surface was prepared according to the same BiVO$_4$ electrode preparation procedure of Comparative Example 1, except for removing V$_2$O$_5$ by immersing the BiVO$_4$ electrode for 30 minutes in a mixture solution of 50 mL of 1 M NaOH and 50 mL of a graphene quantum dot solution dispersed in water, followed by washing with water and drying at room temperature. For Examples 1-1, 1-2 and 1-3, the graphene quantum dots of Preparation Example 1-1 (100° C.), Preparation Example 1-2 (120° C.) and Preparation Example 1-3 (140° C.) were used, respectively.

Figure 1B:
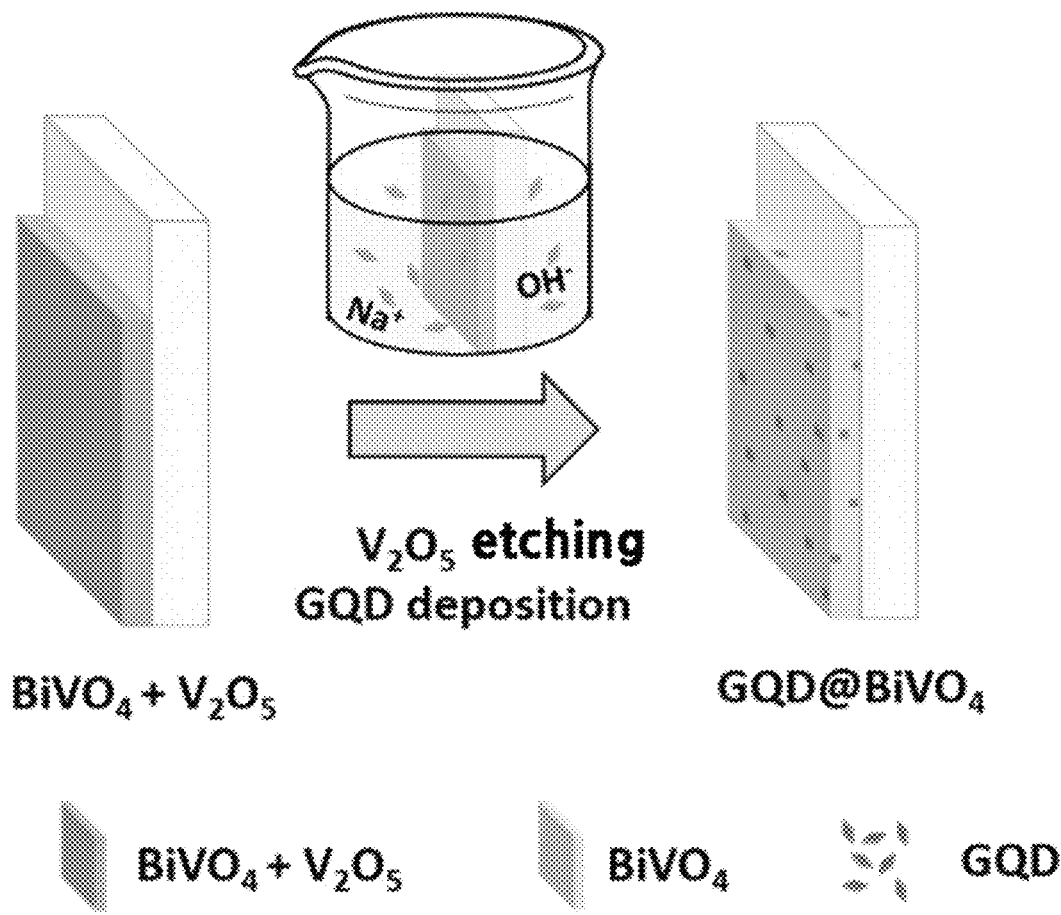
Figure 1C:
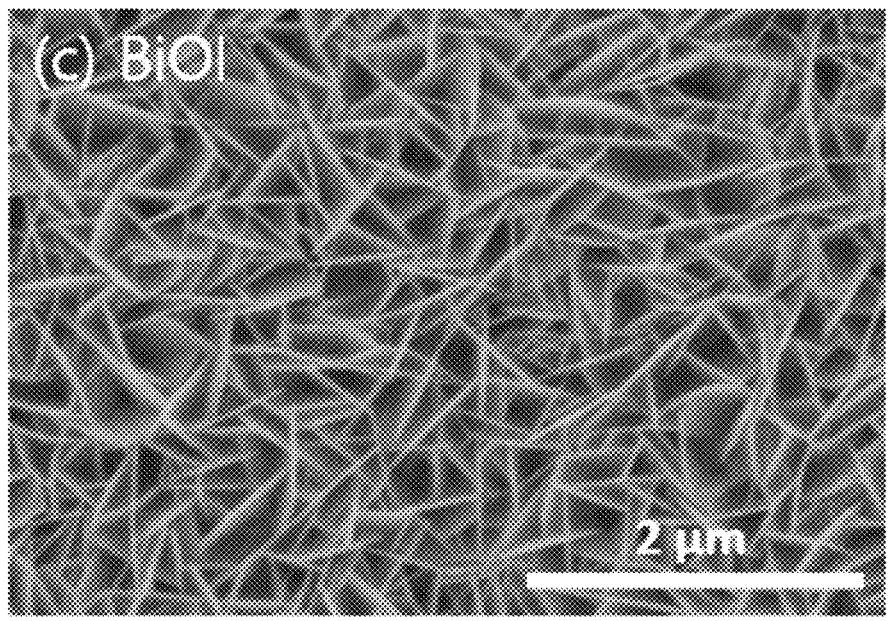
Figure 1D:
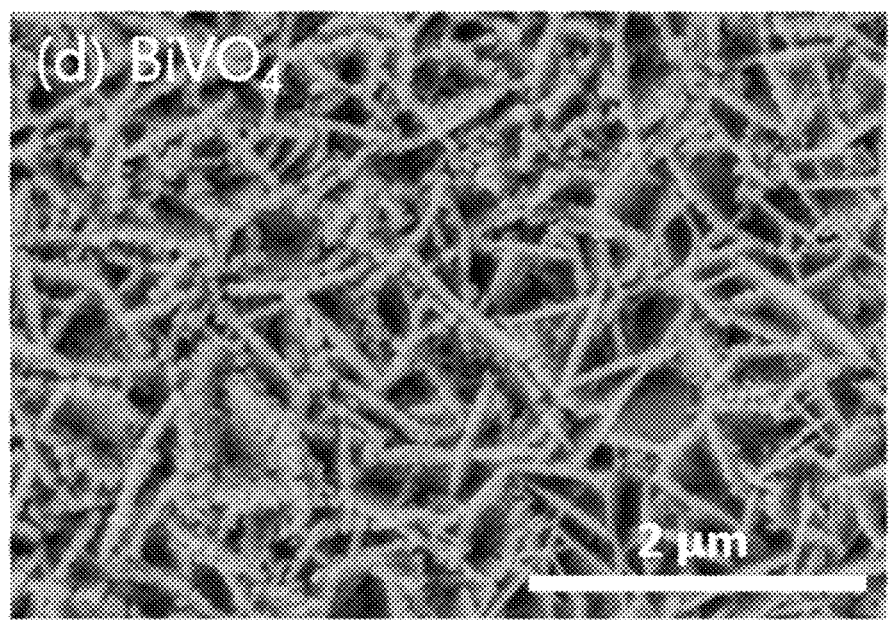
Figure 1E:
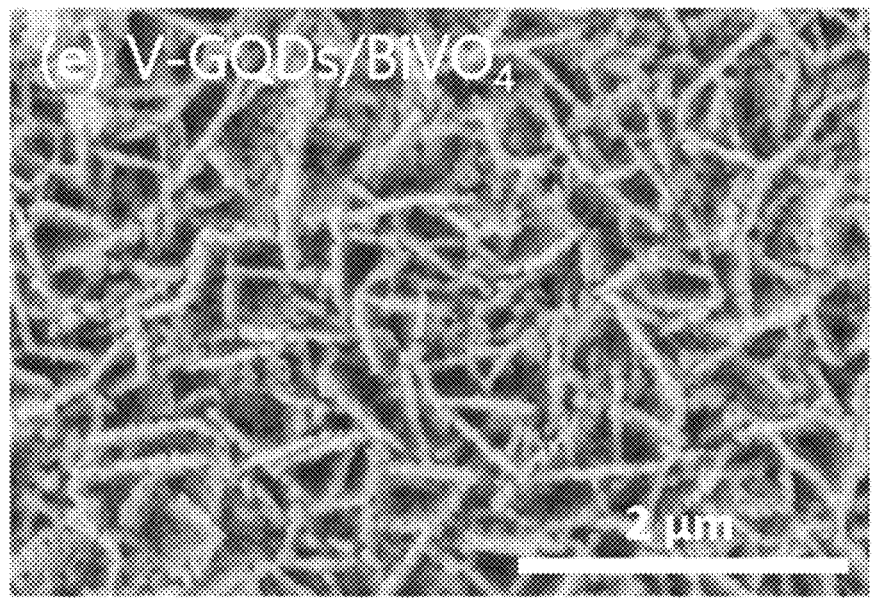

FIGS. 1A to 1E show schematics of a process of preparing the existing BiVO$_4$ electrode in Comparative Example 1 (FIG. 1A) and a process of preparing the BiVO$_4$ electrode including vanadium-functionalized GQDs in Example 1 (FIG. 1B), and scanning electron microscopy (SEM) images of the fluorine-doped tin oxide (FTO) with a BiOI nanosheet formed (FIG. 1C), the existing BiVO$_4$ electrode prepared in Comparative Example 1 (FIG. 1D) and the BiVO$_4$ electrode including vanadium-functionalized GQDs prepared in Example 1-2 (FIG. 1E).

FIG. 1A shows a process of removing V$_2$O$_5$ in the final step of the existing BiVO$_4$ electrode preparation process by immersing the electrode in a 1 M NaOH solution. Because 1 M NaOH is a strong alkaline solution with a pH above 13, the BiVO$_4$ electrode is damaged if it remains in the NaOH solution after V$_2$O$_5$ has been removed. FIG. 1B shows a process of etching V$_2$O$_5$ by mixing graphene quantum dots in a 1 M NaOH solution to prevent such damage. When a 1 M NaOH solution mixed with graphene quantum dots is used, the damage of the BiVO$_4$ electrode due to exposure to the NaOH solution can be prevented since the graphene quantum dots are adsorbed on the surface of the BiVO$_4$ electrode while V$_2$O$_5$ is removed. SEM measurement was made to investigate if V$_2$O$_5$ was removed well by the mixture solution of NaOH and graphene quantum dots. FIG. 1C shows the structure of the BiOI nanosheet formed on the FTO glass for preparation of the BiVO$_4$ electrode. From FIG. 1D, it can be seen that BiVO$_4$ with a porous structure is formed if a BiVO$_4$ electrode is prepared according to the existing method (i.e., by removing V$_2$O$_5$ in a 1 M NaOH solution). In addition, from FIG. 1E, it can be seen that V$_2$O$_5$ can be removed cleanly and the same structure as FIG. 1D can be obtained by using a mixture solution of a 1 M NaOH solution and graphene quantum dots. In general, graphene quantum dots cannot be observed by SEM because they are several nanometers is size. The SEM image confirms that V$_2$O$_5$ attached to BiVO$_4$ can be removed cleanly using the mixture of NaOH and graphene quantum dots.

Figure 2A:
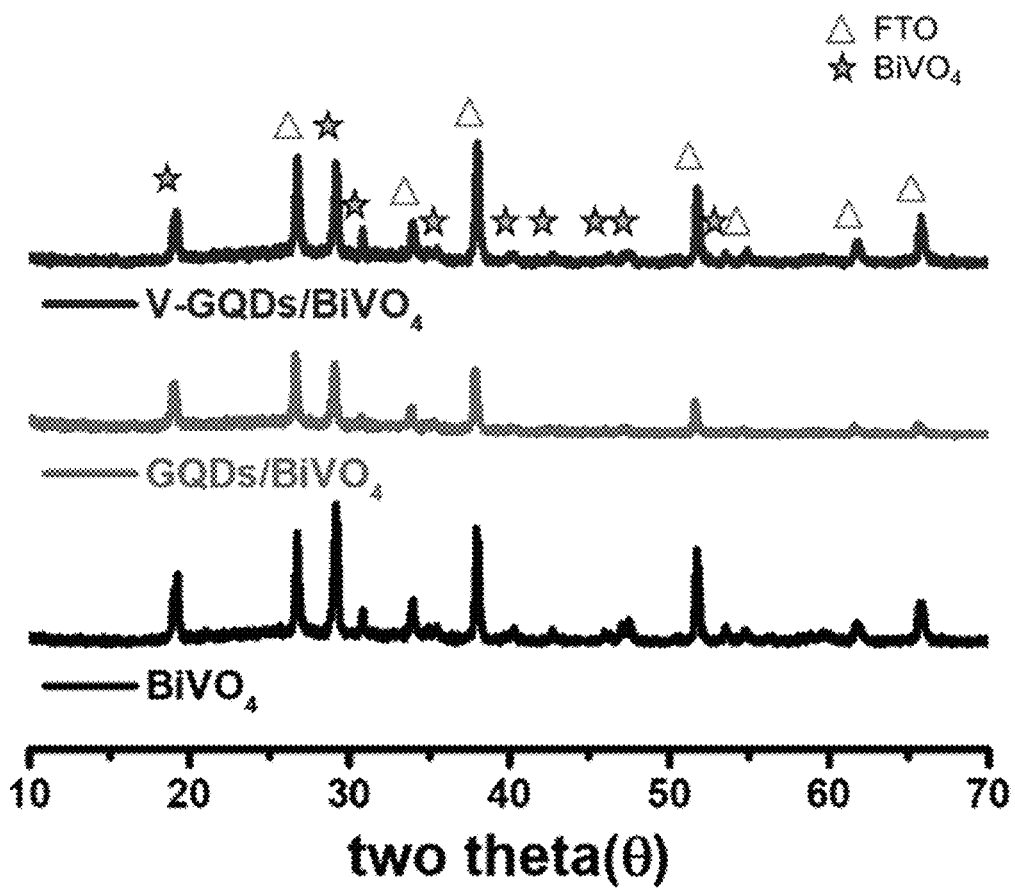
FIGS. 2A to 2C show the X-ray diffraction (XRD) pattern (FIG. 2A), Raman spectra (FIG. 2B) and oxygen evolution reaction (OER) activity (FIG. 2C) of GQDs and V-GQDs for an existing $BiVO_4$ electrode ($BiVO_4$) prepared in Comparative Example 1, a GQD-including $BiVO_4$ electrode (GQDs/$BiVO_4$) prepared in Comparative Example 2 and a vanadium-functionalized GQD-including $BiVO_4$ electrode (V-GQDs/$BiVO_4$) prepared in Example 1-2.
Figure 2B:
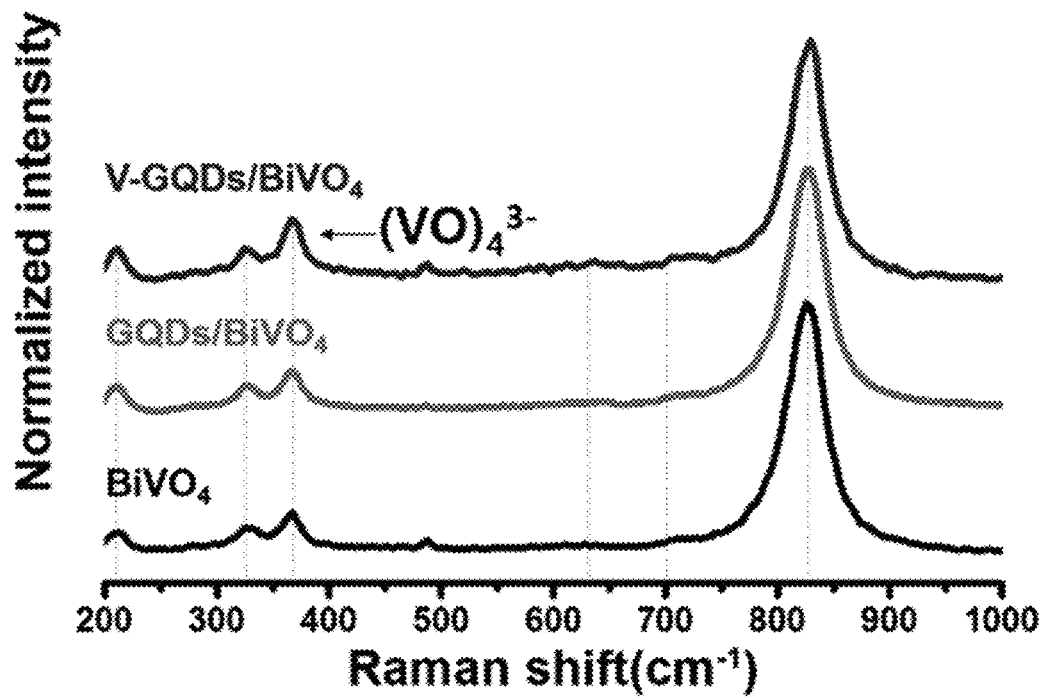
Figure 2C:
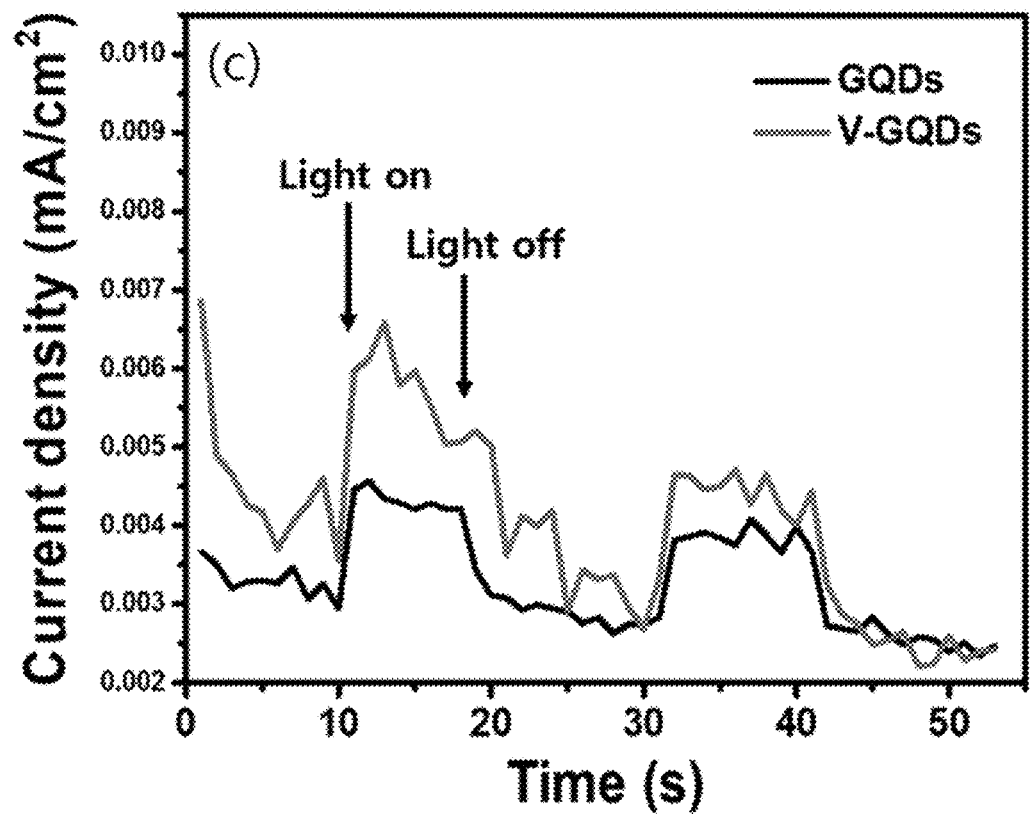

FIGS. 2A to 2C show the X-ray diffraction (XRD) pattern (FIG. 2A), Raman spectra (FIG. 2B) and oxygen evolution reaction (OER) activity (FIG. 2C) of GQDs and V-GQDs for the existing BiVO$_4$ electrode (BiVO$_4$) prepared in Comparative Example 1, the GQD-including BiVO$_4$ electrode (GQDs/BiVO$_4$) prepared in Comparative Example 2 and the vanadium-functionalized GQD-including BiVO$_4$ electrode (V-GQDs/BiVO$_4$) prepared in Example 1-2.

FIGS. 2A to 2C show the result for the existing BiVO$_4$ electrode (Comparative Example 1), the V-GQDs/BiVO$_4$ prepared using a mixture of NaOH solution and graphene quantum dots (Example 1-2) and the GQDs/BiVO$_4$ prepared by removing V$_2$O$_5$ according to the existing method as in Comparative Example 1 and then adsorbing GQDs in order to confirm change from GQDs to V-GQDs (Comparative Example 2). It is reported that GQDs can improve water splitting efficiency by improving oxygen evolution reaction (OER) activity on the surface of BiVO$_4$. From FIGS. 1A to 1E, it was confirmed that the use of a mixture of a NaOH solution and graphene quantum dots during preparation of BiVO$_4$ allows for removal of V$_2$O$_5$ without structural change. XRD and Raman analyses were conducted further to investigate the effect on the structure of BiVO$_4$.

FIG. 2A shows the crystal patterns of FTO and BiVO$_4$ analyzed by XRD. Graphene quantum dots are not observed in the XRD patterns because of very low crystallinity and relatively smaller amount as compared to BiVO$_4$. As seen from the XRD patterns, GQDs/BiVO$_4$ or V-GQDs/BiVO$_4$ had the same crystal structure as BiVO$_4$ and did not show the formation of a new material. This means that the removal of V$_2$O$_5$ with a mixture solution of NaOH and GQDs does not significantly affect the preparation of BiVO$_4$. The Raman analysis result of FIG. 2B also shows that the same signals appear at the same locations for the three materials, confirming that there is no effect on the preparation of BiVO$_4$. The only difference is that the signal at about 370 cm-1 in the Raman spectra is significantly stronger for V-GQDs/BiVO$_4$ when compared with other materials. This signal is attributable to V-GQDs, which are formed as (VO)$_4^{3-}$ ions released from V$_2$O$_5$ by NaOH are attached to the surface of the graphene quantum dots, are adsorbed on the surface of BiVO$_4$. In order to confirm this, the OER activity of GQDs and V-GQDs extracted from the solution remaining after V$_2$O$_5$ etching was tested. Since GQDs are semiconductors, they have optical activity and weak water splitting can occur only with the GQDs themselves. As seen from FIG. 2C, V-GQDs extracted after V$_2$O$_5$ etching showed higher current density than GQDs. This means that the vanadium (V) ions attached to GQDs can effectively help water splitting as OER catalysts.

Figure 3A:
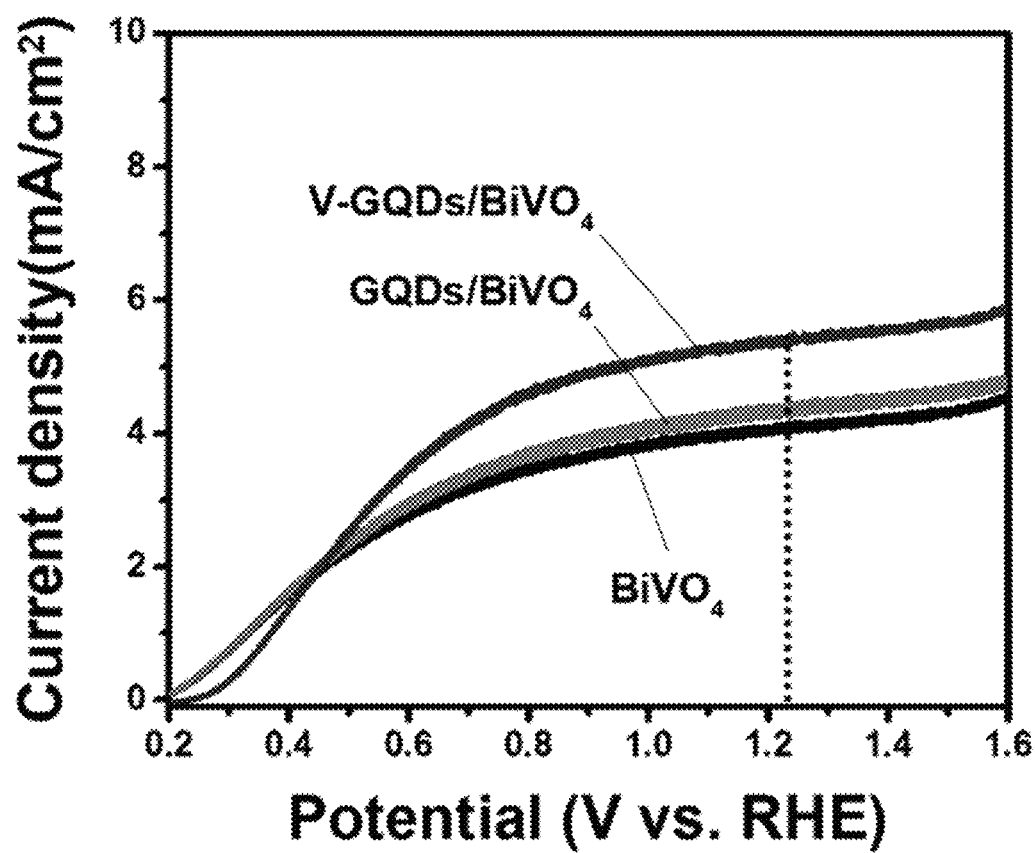
FIGS. 3A and 3B show the photocurrent density (FIG. 3A) and Mott-Schottky plots (FIG. 3B) of an existing $BiVO_4$ electrode ($BiVO_4$) prepared in Comparative Example 1, a GQD-including $BiVO_4$ electrode (GQDs/$BiVO_4$) prepared in Comparative Example 2 and a vanadium-functionalized GQD-including $BiVO_4$ electrode (V-GQDs/$BiVO_4$) prepared in Example 1-2.
Figure 3B:
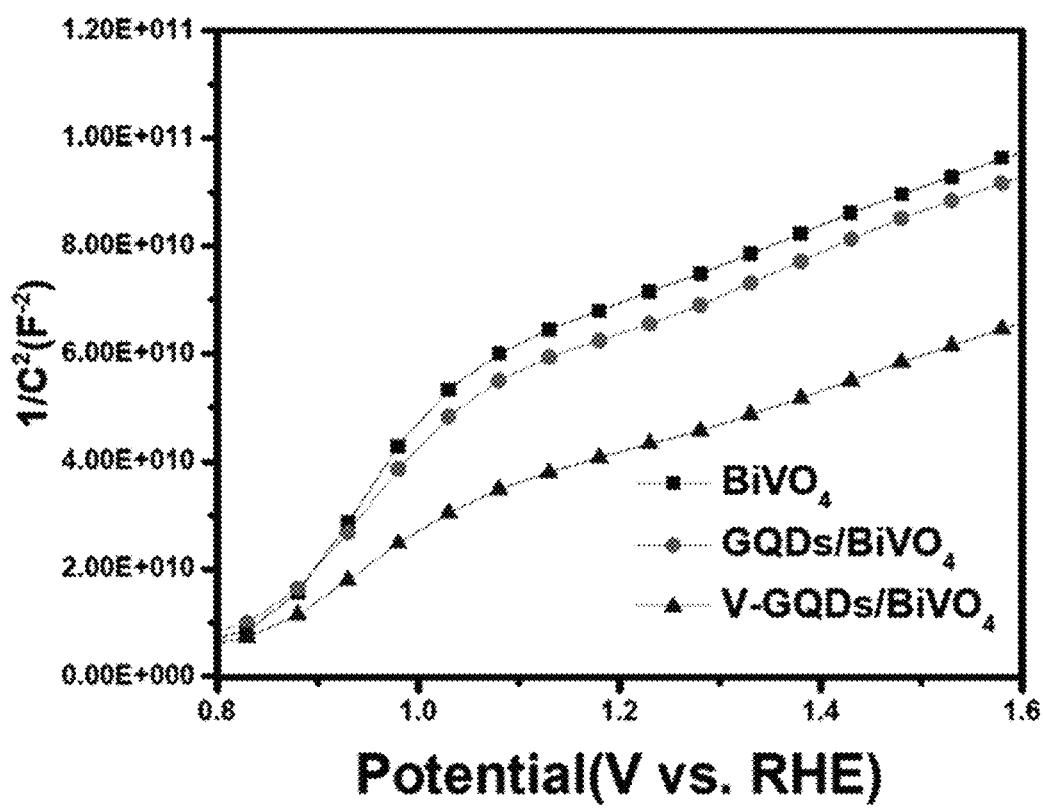

FIGS. 3A and 3B show the photocurrent density (FIG. 3A) and Mott-Schottky plots (FIG. 3B) of the existing BiVO$_4$ electrode (BiVO$_4$) prepared in Comparative Example 1, the GQD-including BiVO$_4$ electrode (GQDs/BiVO$_4$) prepared in Comparative Example 2 and the vanadium-functionalized GQD-including BiVO$_4$ electrode (V-GQDs/BiVO$_4$) prepared in Example 1-2.

FIGS. 3A and 3B show results of testing water splitting performance of the prepared electrodes. For the water splitting performance, a solar simulator (1 SUN) was used. Each of the prepared electrodes was used as a working electrode, a Pt mesh was used as a counter electrode, and an Ag/AgCl electrode was used as a reference electrode. Voltage was calculated versus a reversible hydrogen electrode (RHE). As an electrolyte for testing the water splitting performance, a 0.2 M borate buffer solution with a small amount of $Na_2O_3$ added to prevent recombination and serve as a hole scavenger was used.

As seen from FIG. 3A, the general $BiVO_4$ electrode showed about 4.0 mA/cm$^2$ of a photocurrent density at 1.23 V vs RHE, and the $GQDs/BiVO_4$ electrode showed about 10% improved photocurrent density of 4.4 mA/cm$^2$. And, $V-GQDs/BiVO_4$ showed about 30% improved photocurrent density of 5.3 mA/cm$^2$. These results prove that it is a more effective method of preparing a $GQDs/BiVO_4$ electrode providing superior water splitting efficiency than to attach GQDs after preparing $BiVO_4$. There are two reasons why $V-GQDs/BiVO_4$ exhibits superior efficiency as compared to the other two electrodes. First, GQDs adsorbed on the surface of $BiVO_4$ provide protection during the removal of $V_2O_5$, thereby minimizing damage of $BiVO_4$ from prolonged exposure to NaOH. Second, as described referring to FIGS. 2A to 2C, vanadium (V) ions released as $V_2O_5$ is removed are attached to GQDs and this vanadium functionalization increases the oxygen evolution reaction (OER) activity of GQDs. Mott-Schottky plots were investigated to more clearly confirm this phenomenon (FIG. 3B). As a result, $V-GQDs/BiVO_4$ showed the lowest slope, which means that the damage of $BiVO_4$ by NaOH is minimized, leading to increased formation of charges by $BiVO_4$ in response to light radiation and decreased charge-hole recombination by V-GQDs at the same time.

Figure 4A:
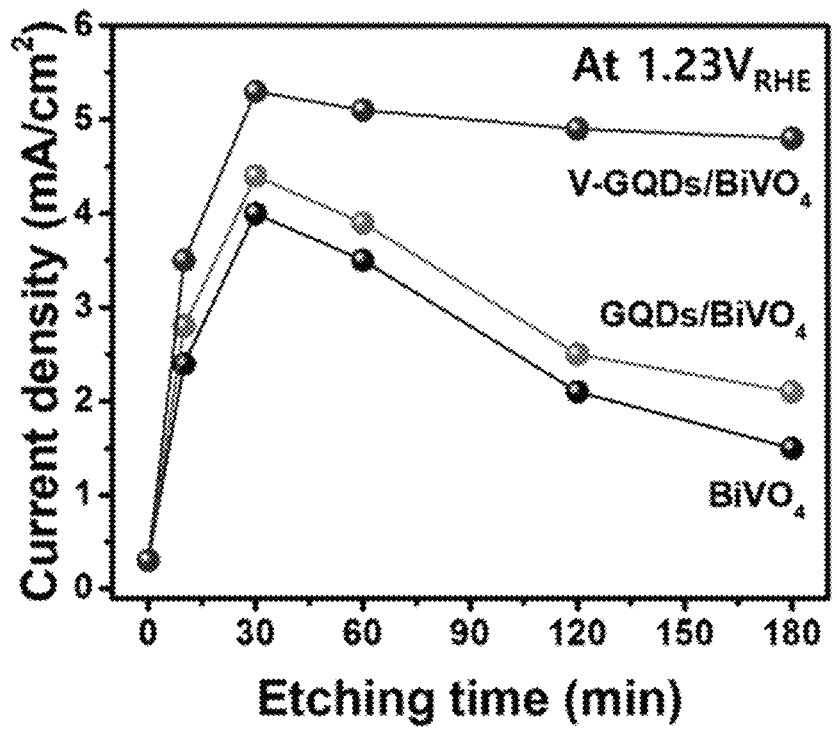
FIGS. 4A and 4B show results of comparing photocurrent density at 1.23 $V_{RHE}$ depending on $V_2O_5$ etching time for an existing $BiVO_4$ electrode ($BiVO_4$) prepared in Comparative Example 1, a GQD-including $BiVO_4$ electrode (GQDs/$BiVO_4$) prepared in Comparative Example 2 and a vanadium-functionalized GQD-including $BiVO_4$ electrode (V-GQDs/$BiVO_4$) prepared in Example 1-2 (FIG. 4A) and a result of testing the stability of a V-GQDs/$BiVO_4$ electrode at 1.23 $V_{RHE}$ (FIG. 4B).
Figure 4B:
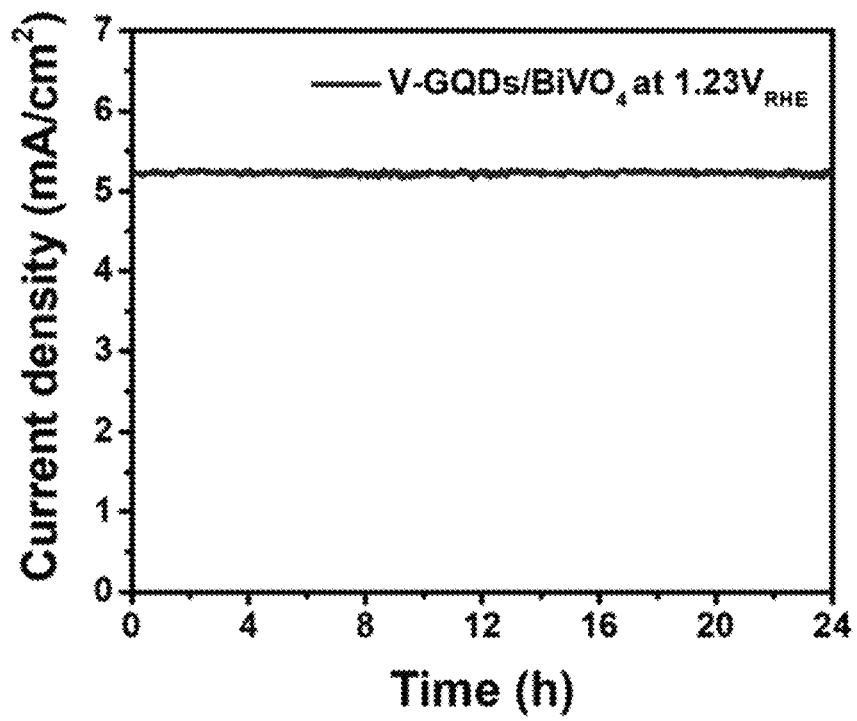

FIGS. 4A and 4B show results of comparing the photocurrent density at 1.23 $V_{RHE}$ depending on $V_2O_5$ etching time for the existing $BiVO_4$ electrode ($BiVO_4$) prepared in Comparative Example 1, the GQD-including $BiVO_4$ electrode ($GQDs/BiVO_4$) prepared in Comparative Example 2 and the vanadium-functionalized GQD-including $BiVO_4$ electrode ($V-GQDs/BiVO_4$) prepared in Example 1-2 (FIG. 4A) and a result of testing the stability of the $V-GQDs/BiVO_4$ electrode at 1.23 $V_{RHE}$ (FIG. 4B).

From FIGS. 1-3, it was confirmed that, when a mixture of NaOH and graphene quantum dots is used for effective removal of $V_2O_5$ and improvement of water splitting performance, catalytic performance is improved as GQDs are converted to V-GQDs and the damage of $BiVO_4$ by NaOH is decreased. In order to check this more directly, photocurrent density was tested by removing $V_2O_5$ with a NaOH solution with different etching time (FIG. 4A). Before etching, all the three electrodes showed low photocurrent density of about 0.3 mA/cm$^2$. This may be because the excessively added $V_2O_5$ fails to contact with $BiVO_4$ and blocks light from $BiVO_4$. The photocurrent density is increased gradually as $V_2O_5$ is etched, and all the three electrodes showed the highest efficiency when etching time was about 30 minutes. This means that $V_2O_5$ was removed cleanly after about 30 minutes. When the etching time exceeded 30 minutes, the photocurrent density of $BiVO_4$ and $GQDs/BiVO_4$ decreased rapidly. Through this, it can be seen that $BiVO_4$ was damaged by the alkaline NaOH solution. In contrast, $V-GQDs/BiVO_4$ showed relatively smaller decrease in efficiency. The slight decrease in efficiency is because V-GQDs are simply adsorbed in the solution and fail to completely cover the surface of $BiVO_4$. However, it showed very stable photocurrent density even after 30 minutes when compared with $BiVO_4$ or $GQDs/BiVO_4$. This result means that V-GQDs are adsorbed onto the surface of $BiVO_4$ with $V_2O_5$ removed and prevent $BiVO_4$ from being damaged by NaOH. Finally, the long-term change of photocurrent density at 1.23 $V_{RHE}$ was monitored to investigate the stability of $V-GQDs/BiVO_4$ (FIG. 4B). As a result, there was no change in photocurrent density for 24 hours. This means that V-GQDs are sufficiently stable as oxygen evolution reaction (OER) catalysts.

Figure 5A:
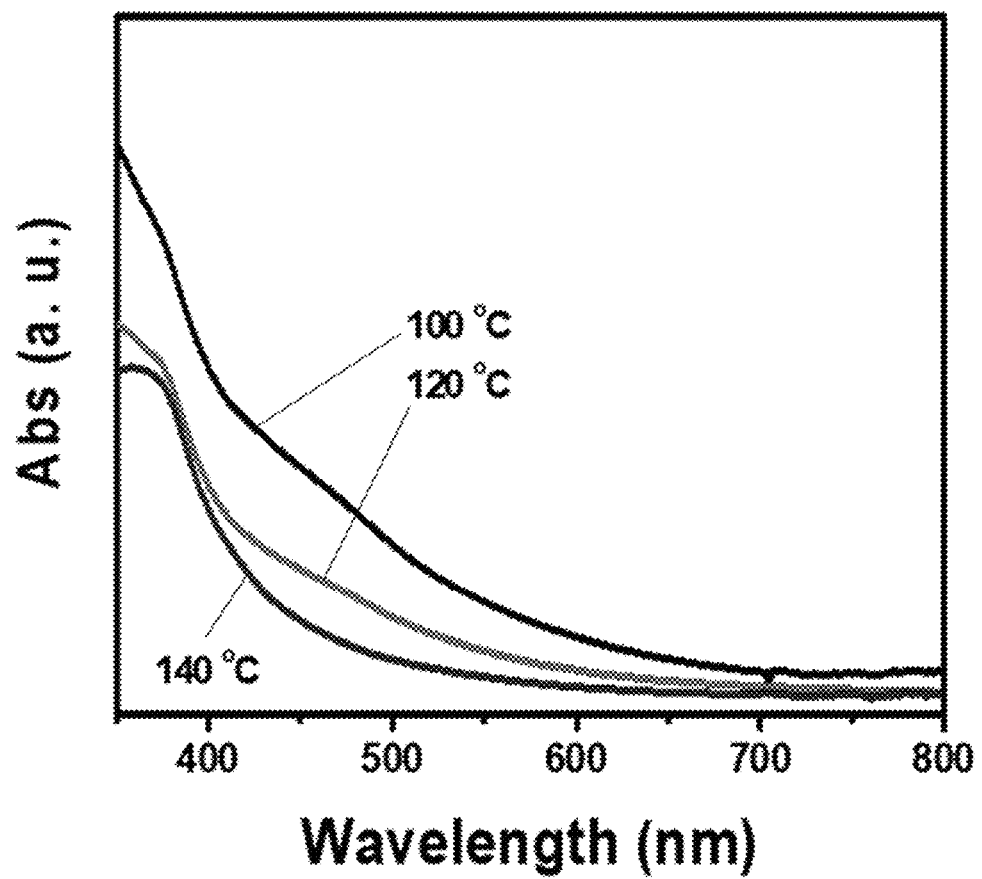
FIGS. 5A to 5C show a light absorbance analysis result (FIG. 5A), a photoluminescence analysis result (FIG. 5B) and the change in the photocurrent density of V-GQDs/$BiVO_4$ of graphene quantum dots prepared in Preparation Examples 1-1 to 1-3 [100° C. (Preparation Example 1-1), 120° C. (Preparation Example 1-2) and 140° C. (Preparation Example 1-3); 100° C. V-GQDs/$BiVO_4$ (Example 1-1), 120° C. V-GQDs/$BiVO_4$ (Example 1-2) and 140° C. V-GQDs/$BiVO_4$ (Example 1-3) (FIG. 5C)].
Figure 5B:
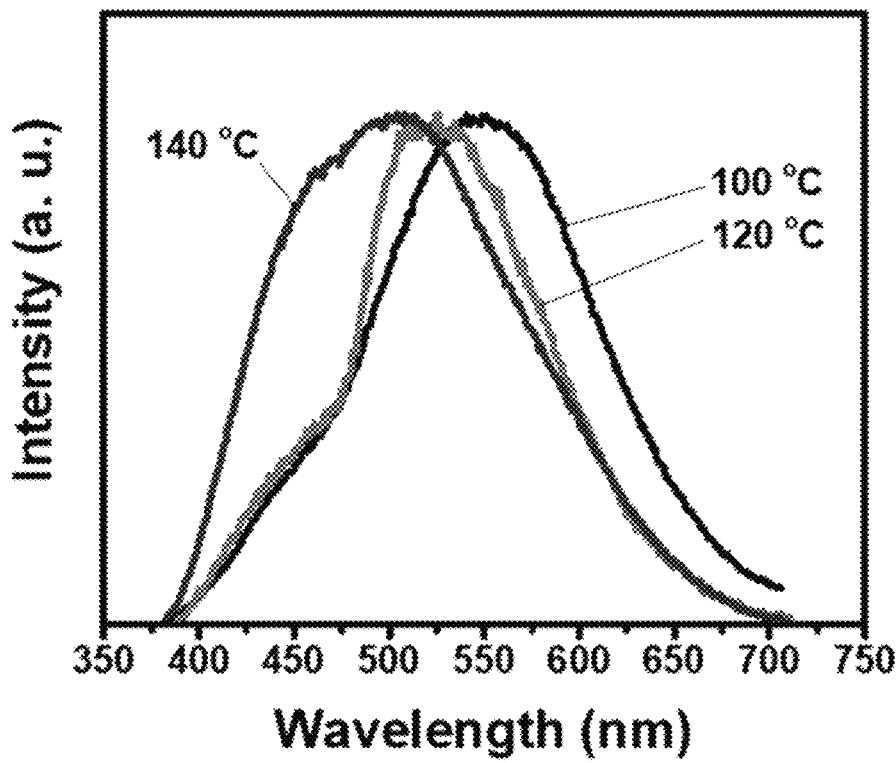
Figure 5C:
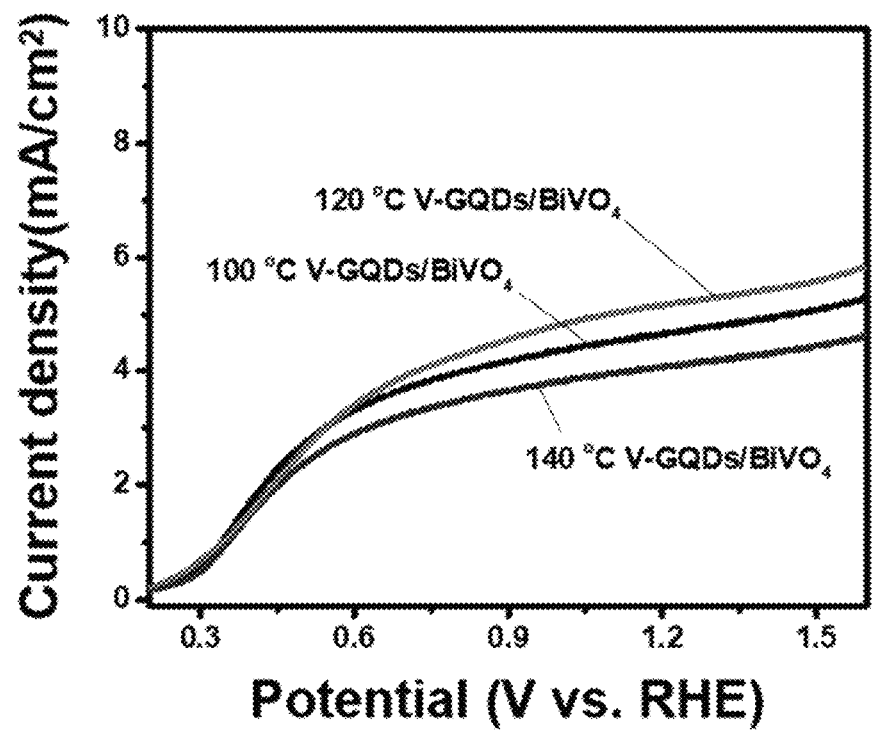

FIGS. 5A to 5C show the light absorbance analysis result (FIG. 5A), the photoluminescence analysis result (FIG. 5B) and the change in the photocurrent density of $V-GQDs/BiVO_4$ of the graphene quantum dots prepared in Preparation Examples 1-1 to 1-3 [(a), (b); 100° C. (Preparation Example 1-1), 120° C. (Preparation Example 1-2) and 140° C. (Preparation Example 1-3), (c); 100° C. $V-GQDs/BiVO_4$ (Example 1-1), 120° C. $V-GQDs/BiVO_4$ (Example 1-2) and 140° C. $V-GQDs/BiVO_4$ (Example 1-3)] (FIG. 5C).

In Example 1, the size of graphene quantum dots could be controlled with the heat treatment (oxidation cutting) temperature of the pitch-based carbon fiber. The graphene quantum dots prepared at different heat treatment temperatures or 100° C. (Preparation Example 1-1), 120° C. (Preparation Example 1-2) and 140° C. (Preparation Example 1-3) showed different light absorbance and photoluminescence. The size of graphene quantum dots can be estimated based on the light absorbance and photoluminescence measurement results and the previously reported literature (Peng, Juan, et al. "Graphene quantum dots derived from carbon fibers." *Nano Letters* 12.2 (2012): 844-849). The graphene quantum dots prepared at 100° C. had a size of 7-9 nm, the graphene quantum dots prepared at 120° C. had a size of 6-8 nm, and the graphene quantum dots prepared at 140° C. had a size of 5-7 nm. In addition, the photocurrent density of the $V-GQDs/BiVO_4$ prepared using the graphene quantum dots was tested (FIG. 5C). The graphene quantum dots prepared at 120° C. (Example 1-2) showed the best result.

Therefore, according to the present disclosure, by adding graphene quantum dots in the process of immersing a bismuth vanadate ($BiVO_4$) electrode in an alkaline solution to remove vanadium oxide ($V_2O_5$) excessively formed on the surface of the electrode during its preparation, the electrode can be protected from the alkaline solution as the graphene quantum dots are adsorbed onto the surface of $BiVO_4$ while $V_2O_5$ is removed, and the efficiency of oxygen evolution reaction (OER) can be improved when applied to a photoanode due to vanadium (V)-functionalized graphene quantum dots formed as the etched vanadium ions ($(VO)_4^{3-}$) are adsorbed onto the graphene quantum dots.

What is claimed is:

1. A bismuth vanadate electrode comprising vanadium-functionalized graphene quantum dots, comprising:
   (i) a bismuth vanadate ($BiVO_4$) electrode; and
   (ii) graphene quantum dots adsorbed on the surface of the bismuth vanadate electrode,
   wherein the graphene quantum dots are vanadium-functionalized by adsorption of $(VO)_4^{3-}$ vanadium ions.

2. The bismuth vanadate electrode comprising vanadium-functionalized graphene quantum dots according to claim 1, wherein, in an effective peak formed in a range of 350-400 cm$^{-1}$ as a result of Raman spectroscopy for the bismuth vanadate comprising vanadium-functionalized graphene quantum dots, wherein said effective peak comprises a peak intensity ($I_A$) of bismuth vanadate and a peak intensity ($I_B$) of the bismuth vanadate comprising vanadium-functionalized graphene quantum dot, an intensity ratio ($I_B/I_A$) of the peak intensity ($I_A$) of bismuth vanadate and the peak intensity ($I_B$) of the bismuth vanadate comprising vanadium-functionalized graphene quantum dot is 1.1-3.

3. A photoanode comprising the bismuth vanadate electrode comprising vanadium-functionalized graphene quantum dots according to claim 1.

4. A photoelectrochemical cell for water splitting, comprising the photoanode according to claim 3.

* * * * *